CRUST ROLLER AND CUTTER
Filed July 5, 1962 4 Sheets-Sheet 1
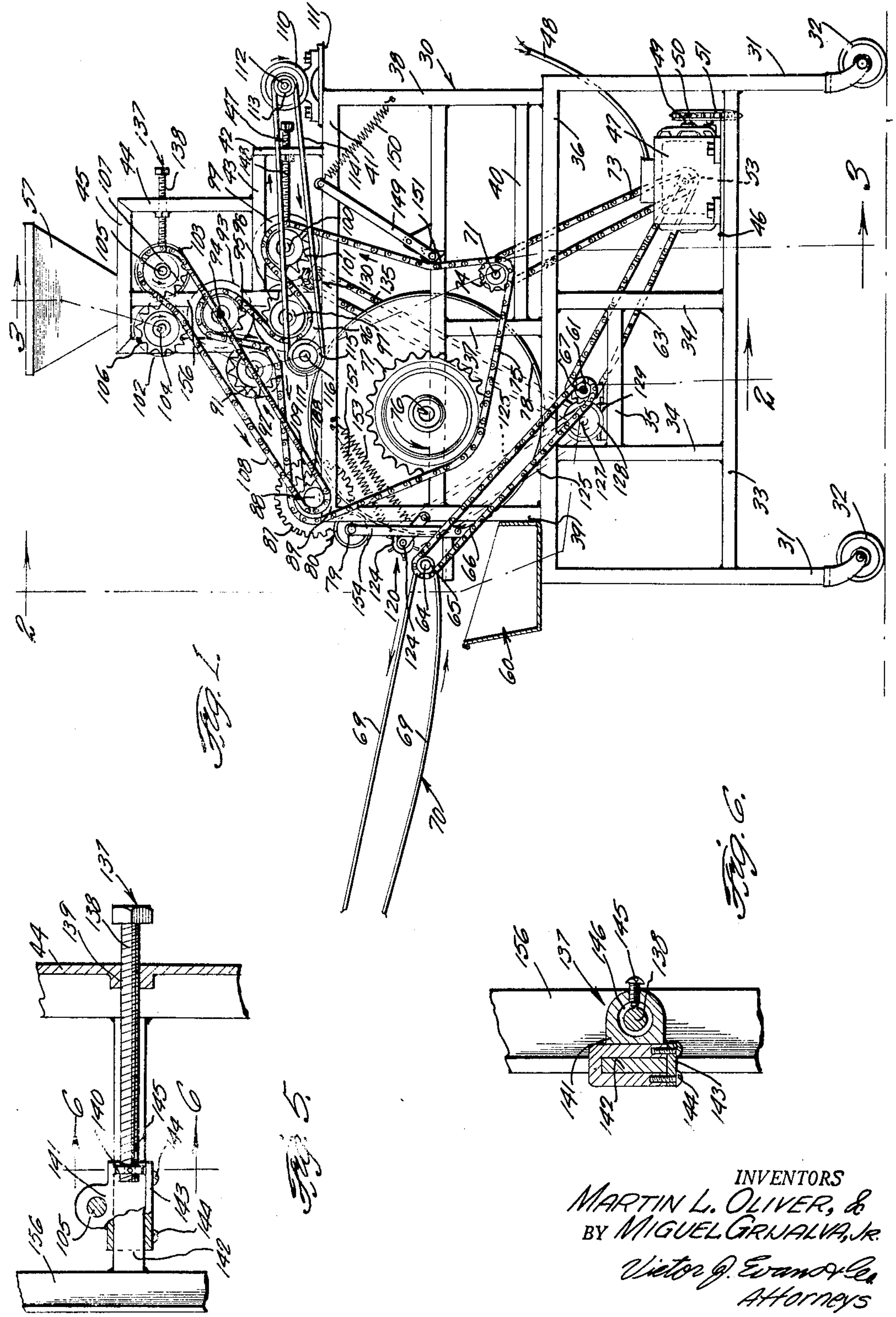
INVENTORS
MARTIN L. OLIVER, &
BY MIGUEL GRIJALVA, Jr.
Victor J. Evans & Co.
Attorneys

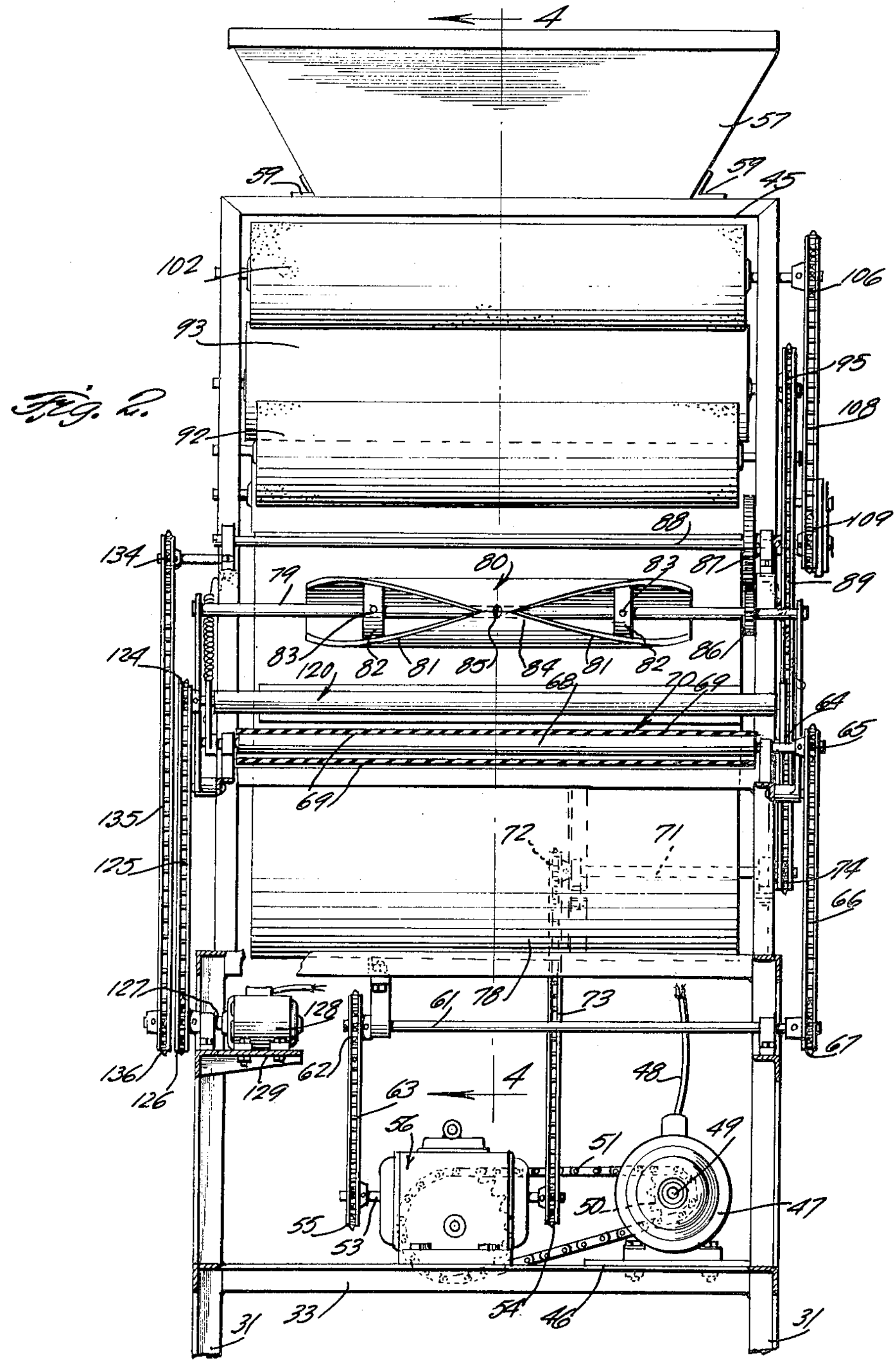
INVENTORS
MARTIN L. OLIVER, &
BY MIGUEL GRIJALVA, Jr.
Victor J. Evans & Co.
Attorneys CRUST ROLLER AND CUTTER
Filed July 5, 1962 4 Sheets-Sheet 3
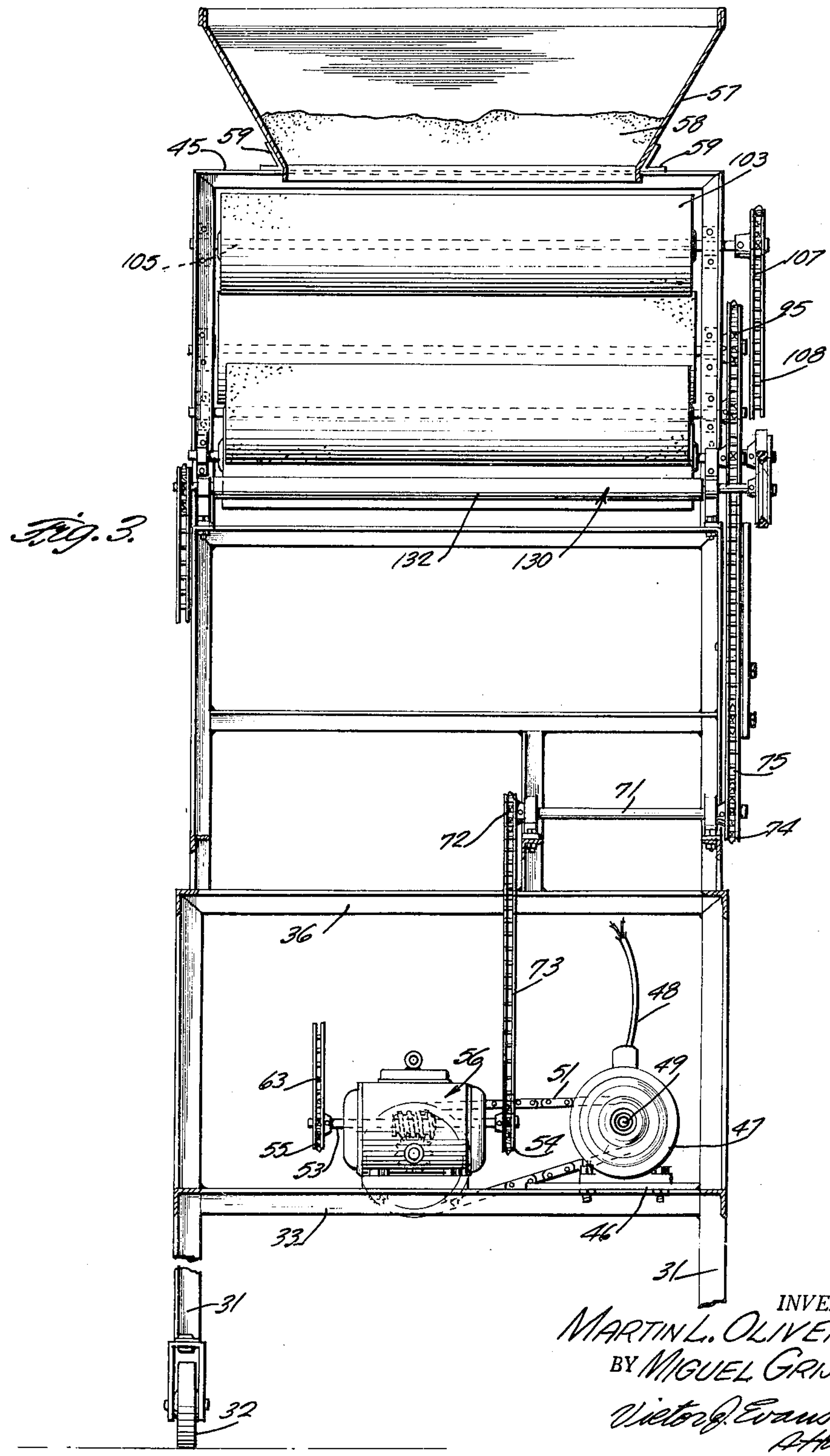
INVENTORS
MARTIN L. OLIVER, &
BY MIGUEL GRIJALVA, JR.
Victor J. Evans & Co.
Attorneys CRUST ROLLER AND CUTTER
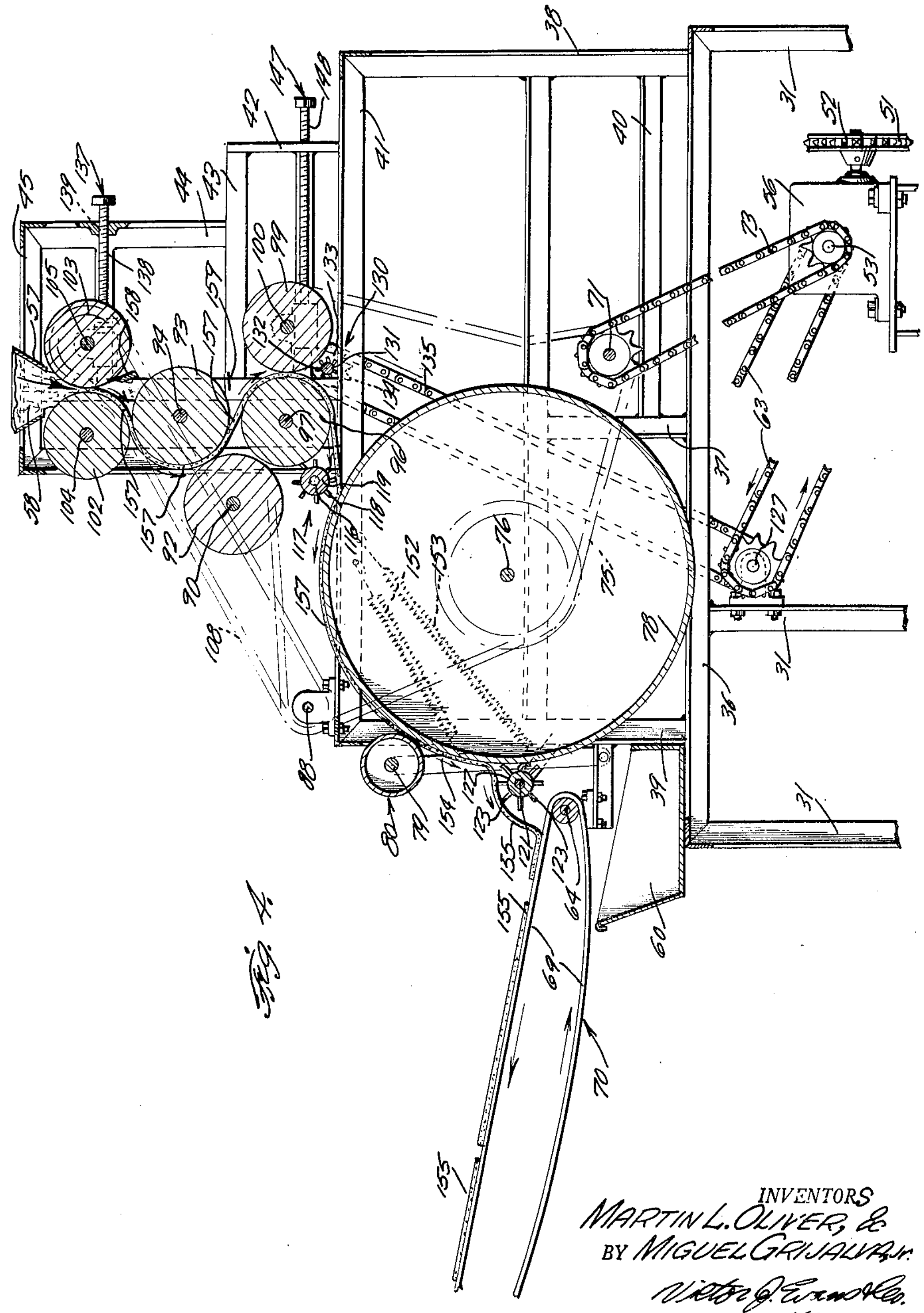
INVENTORS
MARTIN L. OLIVER, &
BY MIGUEL GRIJALVA, Jr.
Victor J. Evans & Co.
Attorneys United States Patent Office 3,220,361

Patented Nov. 30, 1965

3,220,361

CRUST ROLLER AND CUTTER

Martin L. Oliver and Miguel Grijalva, Jr., both of Box 43, Mesilla, N. Mex.

Filed July 5, 1962, Ser. No. 207,589
4 Claims. (Cl. 107—12)

The present invention relates to a machine or apparatus for rolling and cutting crust, and more particularly to a machine for making tortillas.

The primary object of this invention is to provide a machine which is especially suitable for use in rolling and cutting or forming dough whereby tortillas can be conveniently made from a sheet or mass of dough.

A further object is to provide a machine of the type stated which is constructed so that dough is adapted to be fed from a hopper and wherein the dough from the hopper goes to a pair of rollers which compresses the dough and wherein a means is provided for adjusting the rollers to the desired thickness of the tortillas, and wherein the dough is subsequently passed between other rollers and then moved into position for engagement by a drum and cutter mold whereby the tortillas have the desired shape and size or form and are then deposited on a conveyor to be transported or moved to a desired location.

Still another object is to provide such a machine that is economical to manufacture and efficient in operation and which is rugged in structure and foolproof in use.

These and other objects of the invention will become apparent from a reading of the following specification and claims, together with the accompanying drawings wherein like parts are referred to and indicated by like reference characters and wherein:

FIGURE 1 is a side elevational view of the crust roller and cutter, constructed according to the present invention.

FIGURE 2 is a sectional view taken on the line 2—2 of FIGURE 1.

FIGURE 3 is a sectional view taken on the line 3—3 of FIGURE 1.

FIGURE 4 is a sectional view taken on the line 4—4 of FIGURE 2.

FIGURE 5 is a fragmentary sectional view which shows a portion of the roller adjusting mechanism.

FIGURE 6 is a sectional view taken on the line 6—6 of FIGURE 5.

Referring in detail to the drawings, there is illustrated a machine for rolling and cutting crust whereby tortillas can be conveniently formed or made, and as shown in the drawings the machine of the present invention includes a frame that is indicated generally by the numeral 30, and the frame 30 includes spaced parallel vertically disposed legs 31 which have wheels or casters 32 on the lower ends thereof, FIGURE 1. The frame 30 further includes horizontally disposed crosspieces 33 as well as upstanding braces 34 which may be interconnected by a cross member 35, and the frame 30 further includes horizontal members 36 as well as upstanding elements or members 37 and vertical members 38 and 39. The frame 30 may also include braces or horizontal members 40, as well as horizontal members 41, and upstanding members 42 which are interconnected by horizontal pieces 43, and vertical members 44 are secured as by welding to the members 43, and the upper ends of the members 44 may be joined together by horizontal pieces or members 45.

The numeral 46 indicates a horizontally disposed platform which is suitably affixed to the frame 30, FIGURE 2, and a motor 47 is supported on the platform 46, the motor 47 being adapted to be connected to a suitable source of electrical energy as for example by means of the wire or conductor 48, and a suitable switch can be provided for controlling actuation of the motor 47. The numeral 49 indicates a shaft driven by the motor 47, and the shaft 49 has a sprocket 50 thereon, there being an endless chain 51 arranged in engagement with the sprocket 50, and the chain 51 is also arranged in engagement with a sprocket 52 which is operatively connected to a transmission or gear reducer 56. The numeral 53 indicates a shaft driven from the transmission 56, and the shaft 53 has sprockets 54 and 55 thereon for a purpose to be later described.

The numeral 57 indicates a hopper which is supported and mounted on the upper portion of the frame 30, and the hopper 57 is adapted to receive a quantity or mass of dough as indicated by the numeral 58, FIGURE 3, and the hopper 57 may be secured in place between braces or angle irons 59. The numeral 60 indicates a trough or receptacle which is suitably mounted on a portion of the frame 30, as for example as shown in FIGURE 1.

As shown in the drawings, the shaft 61 is suitably journaled or supported in bearings on the frame 30, and the shaft 61 is horizontally disposed and has a sprocket 62 on an end thereof, and the numeral 63 indicates an endless chain which is arranged in engagement with the sprockets 62 and 55 so that as the shaft 53 rotates the shaft 61 will similarly rotate. The numeral 64 indicates a horizontally disposed shaft which is supported by the frame, and the shaft 64 has a sprocket 65 on one end thereof, and the numeral 66 indicates a chain which is arranged in engagement with the sprocket 65, and chain 66 is also arranged in engagement with the sprocket 67 on the shaft 61. The shaft 64 has a roller 68 thereon, and the numeral 69 indicates a portion of a wide endless belt which is arranged in engagement with the roller 68, and the belt 69 forms part of a conveyor 70 which is adapted to be used for conveying or transporting the completed tortillas to a desired location away from the machine of the present invention.

A shaft 71 has a sprocket 72 thereon, and a chain 73 is arranged in engagement with the sprocket 72, and the chain 73 also engages the sprocket 54 which is driven from the transmission 56.

The numeral 74 indicates a sprocket on the shaft 71, and an endless chain 75 is arranged in engagement with the teeth of the sprocket 74, and the chain 75 also engages a large gear member or sprocket 77 which is connected to a horizontally disposed shaft 76, and a roller drum or cylindrical drum 78 is mounted on the shaft 76.

The numeral 79 indicates a horizontally disposed shaft which has a rotary cutter mold 80 thereon, FIGURE 2, and the cutter mold 80 includes a cutaway or recessed portions 81, and there are provided collars 82 which are connected to the shaft 79 as at 83, and the cutter mold 80 includes an intermediate portion 84 which is adapted to have an indentation 85 therein. The shaft 79 has a gear 86 thereon which meshes with a gear 87 on a shaft 88, and the shaft 88 has a sprocket 89 affixed thereto, the chain 75 being arranged in engagement with the sprocket 89.

The chain 75 is also arranged in engagement with the teeth of a sprocket 91 on shaft 90, and the shaft 90 has a primary compressor roller 92 thereon, and there is also provided another primary compressor roller 93 which is mounted on a shaft 94, and the shaft 94 has a sprocket 95 thereon which is engaged by a portion of the endless chain 75.

The numeral 96 indicates a secondary compressor roller which is mounted on a shaft 97, and a sprocket 98 on the shaft 97 is engaged by the chain 75. The numeral 99 indicates a secondary compressor roller which is mounted on a shaft 100 and the shaft 100 has a sprocket 101 thereon which is also engaged by the chain 75.

The crust roller and cutter of the present invention further includes a pair of feeder rollers 102 and 103 which are arranged adjacent the lower end of the hopper 57, and the feeder rollers 102 and 103 are mounted on shafts 104 and 105 respectively, and the shafts 104 and 105 are adapted to have the sprockets 106 and 107 connected thereto, the numeral 108 indicating an endless chain which engages the teeth of the sprockets 106 and 107, and the chain 108 also engages a sprocket 109 on the shaft 88.

In FIGURE 1 of the drawings, it will be seen that a motor 110 is adapted to be suitably supported on a horizontal platform or base 111 which is suitably affixed to a portion of the frame 30, and the motor 110 including a shaft 112 which has a pulley 113 thereon, and an endless belt 114 is trained around or arranged in engagement with the pulley 113 and the belt 114 also engages a pulley 115 on a shaft 116, and the shaft 116 forms part of a separator spinner 117 which is shown to include a roller 119 that has bristles or fingers 118 affixed thereto, FIGURE 4.

The numeral 120 indicates a separator spinner which is arranged for coaction with the roller drum 78, and the separator spinner 120 includes the shaft 121 which has a roller 122 thereon, and fingers or bristles 123 are suitably affixed to the roller 122 and may perform the function of separating as well as smoothing. Separator 120 may also consist of a solid shaft of metal for performing a separating action on the dough from roller 96 and for smoothing the upper surface of the dough. A sprocket 124 on the shaft 121 is engaged by a chain 125, and the chain 125 engages a sprocket 126 on a shaft 127, and the shaft 127 is driven from a motor 128 which is supported as at 129, FIGURE 2.

The numeral 130 indicates a separator spinner which includes a horizontally disposed shaft 131 that has a roller 132 thereon, and the roller 132 has spaced apart fingers or bristles 133 affixed thereto, and the numeral 134 indicates a sprocket on the shaft 131, there being an endless chain 135 arranged in engagement with the sprocket 134, and the sprocket chain 135 also engages the teeth of a sprocket 136 which is driven from the shaft 127 by the motor 128. Separator 130 may also consist of a solid shaft of metal for performing the same function as separator 120.

There is also provided an adjustment means which is indicated generally by the numeral 137 whereby the feeder roller 103 can be adjusted or moved towards and away from the feeder roller 102, and this adjustment means is shown in detail in FIGURES 5 and 6, and includes screw members or bolts 138 which are arranged in threaded engagement with apertures 139 in the members 44, and ends of the screw members 138 are connected as at 140 to sliding bearing blocks 141 which support the shaft 105, and the bearing blocks 141 are maintained in sliding engagement with horizontal members 142 as for example by means of a plate or retainer 143 that is secured in place as at 144. The numeral 145 indicates a set screw which engages a grooved portion 146 in the screw member 138 so that the necessary adjustment of the shaft 105 can take place when the screw member 138 is properly rotated.

There is also provided a manually operable adjusting means which is indicated generally by the numeral 147, and the adjusting means 147 is used for adjusting or moving the secondary compressor roller 99 towards or away from the secondary compressor roller 96, and the adjustment means 147 includes screw members 148 which have a construction and function similar to that described in connection with the screw members 138.

The numeral 151 indicates a slack adjuster for the chain 75, and the slack adjuster 151 has a lever 149 connected thereto, and the lever 149 is urged in the proper direction by means of a spring member 150. Lever 149 pivots about a point intermediate its ends so that spring 150 biases the adjuster against the chain. Such biasing reduces slack in chain 75.

There are further provided spring members 152 and 153 which function as tension devices or slack adjusters, FIGURE 1.

The shaft 79 which supports the cutter mold 80 is supported by pivotally mounted levers 154 which are urged in the proper direction by means of the spring arrangement 152 and spring member 153 is shown connected to the separator spinner 120 to provide urgining in a corresponding direction.

In FIGURE 4 the numeral 155 indicates the crusts or tortillas which are formed or made according to the machine of the present invention, and these tortillas 155 are subsequently conveyed to a suitable receptacle or the like for cooking, frying or the like.

In FIGURES 5 and 6 the numeral 156 indicates vertical frame pieces which have the horizontal elements or pieces 142 secured thereto as by welding.

From the foregoing, it will be seen that there has been provided a machine which is especially suitable for forming articles such as the crusts or tortillas 155, and in use with the parts arranged as shown in the drawings, it will be seen that a mass or quantity of dough 58 is adapted to be supplied from a suitable source of supply into the hopper 57, and this dough travels downwardly by gravity between the feeder rollers 102 and 103, whereby there is formed a sheet of dough which is indicated by the numeral 157, and this sheet of dough 157 then passes downwardly between the primary compressor rollers 192 and 93, and then the sheet of dough 157 passes downwardly between the secondary compressor rollers 96 and 99. Then, the sheet of dough 157 travels along until it passes between the cutter mold 80 and the drum 78 whereby due to the construction and arrangement of the cutter mold 80, the tortillas 155 will be formed, and the tortillas 155 will be automatically deposited on the traveling belt 69 of the conveyor 70. The conveyor 70 transports the articles 155 to a suitable receptacle or other locality for subsequent processing. The portions of the dough which are cut away during the formation of the tortillas 155, will be automatically received in the trough 60, and the trough 60 is supported in such a location whereby the scraps of dough which are cut away during the formation of the tortillas 155 will be automatically received in the trough. The cut-away portions 81 of cutter mold 80 coact with the drum 78 in severing a tortilla.

The various feeder rollers and compressor rollers are driven in the proper direction and at the proper time due to the provision of the previously described drive mechanism including the mortors and sprockets and chains units. For example, the motor 47 which is adapted to be electrically actuated and which may be switch controlled, is used for actuating the transmission 56 through the medium of the chain 51, and the transmission 56 rotates the shaft 53 which in turn causes rotation of the shafts 61 and 71 due to the provision of the chains 63 and 73. Rotation of the shaft 71 results in the rotation of the sprocket 74 which in turn causes rotation or movement of the chain 75, and since the chain 75 engages the teeth of the sprocket 77 on the shaft 76, it will be seen that this movement of the chain 75 will cause rotation or movement of the drum 78 in the desired manner. Also, this movement of the chain 75 will cause the feeder roller 103 to be driven through the medium of the chain 108 and its associated parts, and the chain 108 also causes rotation of the roller 102. The chain 75 causes rotation in the proper direction of the rollers 96 and 99, and the chain 75 also causes rotation of the rollers 92 and 93 due to the arrangement of the sprockets on the shafts of these rollers which engage the links of the chain 75. The member 151 is adapted to be used for maintaining the desired or proper tension on the chain 75, so that the member 151 functions as a slack adjuster, and the spring 150 serves to exert the proper tension and pressure on the member 151 through the medium of the lever or arm 149.

The motor 110 serves to operate or rotate the separator spinner 117, and the motor 128 serves to operate the separator spinner 130 through the medium of the chain 135, and the motor 128 operates the separator 120 through the medium of the chain 125 and associated sprockets and other parts. The conveyor 70 is actuated through the medium of the chain 66 which is driven from the shaft 61.

The adjusting means shown in FIGURES 5 and 6 permits the feeder roller 103 to be adjusted or moved towards and away from the feeder roller 102. Thus, to adjust the mechanism 137, it is only necessary to rotate the bolts 138 in their corresponding threaded apertures 139 whereby the bearing supports 141 can be slid or adjusted on the horizontal elements 142, and since the shaft 105 is carried by or connected to the slidable bearing supports 141, and with the roller 103 mounted on the shaft 105, it will be seen that this rotation of the bolts or screws 138 will cause the roller 103 to be adjusted or moved towards or away from the roller 102 as desired or required. Similarly, the adjusting mechanism 147 includes the screws or bolts 148 that are adapted to be properly adjusted in order to move the roller 99 towards or away from the roller 96.

The machine includes the frame that is bound on casters or wheels 32 so that the machine can be readily moved from place to place as desired or required.

The parts can be made of any suitable material and in different shapes or sizes.

The mechanism 137 functions as a feeder adjustment, while the mechanism 147 functions as a weight and thickness adjustment means. FIGURE 4 shows the path of movement of the dough through the rollers and through the machine. The hopper 57 may hold a suitable quantity of flour dough, and for example the hopper may hold fifteen pounds of flour dough and regulates the amount of dough according to the thickness of a tortilla. The feeder rollers 102 and 103 compress the dough and feed it into the primary rollers 90 and 93 which help to spread the dough. The primary rollers 92 and 93 compress the dough into a thinner layer and deliver the dough to the rollers 96 and 99, and the secondary compressor rollers 96 and 99 compress the dough to the desired thickness of the tortilla. The roller 96 delivers the dough sheet to the cutter drum 78 and separator spinner 117 provides a smooth finish. The separator spinner 120 rotates in a direction which is opposite from the drum cutter and provides a smooth finish to the under side of the dough belting and delivers the tortillas to the conveyor belt 69.

With further reference to the cutter mold 80, the spaced apart collars 82 are adapted to be connected to the shaft 79 as for example by means of set screws 83, and there is provided the indentation 85 at the center of the cutter so that a complete cut is not made and for attaching the tortillas together and the indentations prevent the complete severance of tortillas from one another.

The two rollers 102 and 103 which receive the dough from the hopper may be made with a rough and pitted texture which tends to grab at the mass of dough. Also these rollers are adapted to be a considerable distance apart such as from one-half to three quarters of an inch so that there will be no difficulty in handling the dough and having the dough enter between these rollers.

As shown in FIGURE 4 the scrapers 158 and 159 are adapted to be arranged contiguous to the rollers 103 and 93 and such scrapers are used because at these points the dough is not compressed very thin, and the thickness tends to hold it together, and when the dough goes up against the scrapers 158 and 159, there is a tendency to take the smoothness out and make it rough and scratchy, but this does no harm since when the dough goes into the last set of rollers it will be smoothed out.

It is the last rollers 96 and 99 which require the spinners 117 and 130 to keep it smooth and from sticking to the rollers.

With further reference to the cutter 80, when the cutter cuts out the tortilla, there is a tendency for some of the tortillas to stick to the cutter. To avoid this a small indentation 85 is made at the center of the cutter which results with having the first tortilla attached to the one following by a piece of dough remaining by virtue of the indentation which pulls slightly on the one following, and this keeps the tortillas from sticking on the cutter. The incomplete severance of tortillas from one another provides the means for pulling of the remaining dough and, in this fashion of coupling, they are advanced along on the conveyor 70.

The spinners are adapted to consist of a solid shaft from three-quarter inch steel.

The machine of the present invention takes the dough in bulk directly from the mixer. The size of the crust is determined by the adjustment in the rollers and the side of the cutter. Heretofore, crust rollers have been made so that they only take a ball of dough and the size is determined by the crust desired, and this process of making a ball of dough requires a separate machine process, and the machine of the present invention combines these processes. The present invention is adapted to be used as a crust roller, and it is to be used for making flour tortillas. The machine of the present invention will handle wheat flour dough. Wheat flour dough has quite a bit of elasticity, and is stickier than other forms of dough such as corn dough, and it is much more difficult to compress than corn dough. While other prior art devices have suggested machines for use with corn dough, they have not been able to conveniently handle wheat flour dough, and the present invention overcomes these difficulties or shortcomings. In addiiton, the present invention is adapted to make a very thin smooth sheet of dough of either thickness which is necessary in order to make a tortilla, and this means that the dough as it is fed to the machine is very highly compressed by smooth rollers. The present invention uses a very high velocity of spinners which revolve counter to and up against the rollers, and from the series of compressing rollers the dough goes into the metal roller or large drum for the purpose of keeping a smooth surface and enable the cutter to cut out the tortilla.

Also, in the present invention the ball of dough is not inserted in the hopper, but instead a mass of dough is placed in the hopper, and the amount of this dough does not matter or determine the product which results. The size of the mass dough is determined only by the size of machine. With the present invention it is not necessary to produce separate balls of dough, since a mass of dough can be utilized.

Although the invention herein described is fully capable of achieving the objects and providing the advantages hereinbefore mentioned, it is to be understood that it is merely illustrative of the presently preferred embodiment of the invention, and that the invention is not to be limited to the details of construction herein described other than as defined in the appended claims.

What is claimed is:

1. In a crust rolling and cutting machine, a frame, a hopper mounted on the upper portion of said frame, horizontally disposed spaced parallel first and second feeder rollers supported by said frame positioned below the lower end of said hopper, a pair of compressor rollers supported by said frame, a rotary cutter drum supported by said frame, a cutter mold also mounted on said frame and positioned adjacent said drum for the formation of articles by the cutter mold cooperating with the drum, and a conveyor for receiving articles from said cutter mold, and a trough supported by said frame and arranged adjacently below said conveyor for receiving the portion of the dough sheet remaining after severance therefrom of the articles during the coaction of said cutter drum and mold, and separator spinners arranged contiguous to said compressor rollers and to said drum.

2. In a crust rolling and cutting machine, a frame, a hopper mounted on the upper portion of said frame, horizontally disposed spaced parallel first and second feeder rollers supported by said frame positioned below the lower end of said hopper, a pair of compressor rollers supported by said frame, a rotary cutter drum suported by said fame, a cutter mold also mounted on said frame and positioned adjacent said drum for the formation of articles by the cutter mold cooperating with the drum, and a conveyor for receiving articles from said cutter mold, and a trough supported by said frame and arranged adjacently below said conveyor for receiving the portion of the dough sheet remaining after severance therefrom of the articles during the coaction of said cutter drum and mold, and separator spinners arranged contiguous to said compressor rollers and to said drum, said separator spinners disposed for rotation at a very high velocity, and in a direction which is counter to and up against the rollers.

3. In a crust rolling and cutting machine, a frame, a hopper mounted on the upper portion of said frame, horizontally disposed spaced parallel first and second feeder rollers supported by said frame positioned below the lower end of said hopper, a pair of compressor rollers supported by said frame, a rotary cutter drum supported by said frame, a cutter mold also mounted on said frame and positioned adjacent said drum for the formation of articles by the cutter mold cooperating with the drum, and a conveyor for receiving articles from said cutter mold, and a trough supported by said frame and arranged adjacently below said conveyor for receiving the portion of the dough sheet remaining after severance therefrom of the articles during the coaction of said cutter drum and mold, and separator spinners arranged contiguous to said compressor rollers and to said drum, said separator spinners disposed for rotation at a very high velocity, and in a direction which is counter to and up against the rollers, and drive means for rotating said feeder rollers, compressor rollers, drum, cutter mold and separator spinners.

4. In a crust rolling and cutting machine, a frame, a hopper mounted on the upper portion of said frame, horizontally disposed spaced parallel first and second feeder rollers supported by said frame positioned below the lower end of said hopper, a pair of compressor rollers supported by said frame, a rotary cutter drum supported by said frame, a cutter mold also mounted on said frame and positioned, adjacent said drum for the formation of articles by the cutter mold cooperating with the drum, and a conveyor for receiving articles from said cutter mold, and a trough supported by said frame and arranged adjacently below said conveyor for receiving the portion of the dough sheet remaining after severance therefrom of the articles during the coaction of said cutter drum and mold, and separator spinners arranged contiguous to said compressor rollers and to said drum, said separator spinners disposed for rotation at a very high velocity, and in a direction which is counter to and up against the rollers, and drive means for rotating said feeder rollers, compressor rollers, drum, cutter mold and separator spinners, and means for adjusting the space between the feeder rollers, and means for adjusting the relative space between the compressor rollers.

References Cited by the Examiner

UNITED STATES PATENTS

| | | | |
|---|---|---|---|
| 1,225,481 | 5/1917 | Nuubson et al. | 107—12 |
| 1,763,445 | 6/1930 | Romero | 107—12 |
| 2,055,205 | 9/1936 | Pereyra | 107—12 X |
| 2,666,399 | 1/1954 | Pereyra | 107—12 |
| 2,907,286 | 10/1959 | Ruiz | 107—12 |

FOREIGN PATENTS

| | | |
|---|---|---|
| 254,172 | 7/1926 | Great Britain. |
| 888,981 | 9/1953 | Germany. |

WALTER A. SCHEEL, *Primary Examiner.*

J. D. BEIN, ROBERT E. PULFREY, *Examiners.*